Figure 1:
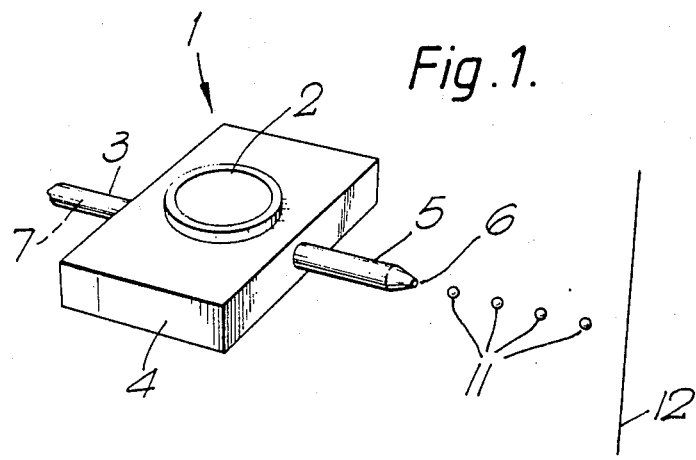

United States Patent [19]

Balmforth et al.

[11] Patent Number: 4,908,062
[45] Date of Patent: Mar. 13, 1990

[54] WATER-SOLUBLE DYE

[75] Inventors: Brian Balmforth, Huddersfield; Nigel Hughes, Oldham, both of England

[73] Assignee: Imperial Chemical Industries PLC, London, United Kingdom

[21] Appl. No.: 294,655

[22] Filed: Jan. 9, 1989

[30] Foreign Application Priority Data

Jan. 22, 1988 [GB] United Kingdom ............... 8801486

[51] Int. Cl.$^4$ .............................................. C09D 11/02
[52] U.S. Cl. ...................................... 106/22; 534/797
[58] Field of Search ........................... 106/22; 534/797

[56] References Cited

U.S. PATENT DOCUMENTS

| | | | |
|---|---|---|---|
| 1,667,312 | 8/1928 | Fritzsche et al. | 534/598 |
| 3,072,454 | 1/1963 | Long et al. | 8/54.2 |
| 4,542,208 | 9/1985 | Odani et al. | 534/797 |
| 4,647,310 | 3/1987 | Shimada et al. | 106/22 |
| 4,654,384 | 3/1987 | Ramanathan et al. | 534/797 |
| 4,670,547 | 6/1987 | Lehr | 534/637 |
| 4,703,113 | 10/1987 | Baxter et al. | 534/796 |
| 4,705,528 | 11/1987 | Baxter et al. | 106/22 |
| 4,713,113 | 12/1987 | Shimada et al. | 106/22 |
| 4,737,190 | 4/1988 | Shimada et al. | 106/22 |

FOREIGN PATENT DOCUMENTS

| | | |
|---|---|---|
| 0177138 | 4/1986 | European Pat. Off. |
| 2511017 | 2/1983 | France |
| 2166147 | 4/1986 | United Kingdom |

Primary Examiner—Paul Lieberman
Assistant Examiner—Helene Klemanski
Attorney, Agent, or Firm—Cushman, Darby & Cushman

[57] ABSTRACT

A water-soluble dye, free from cellulose reactive groups, of the formula:

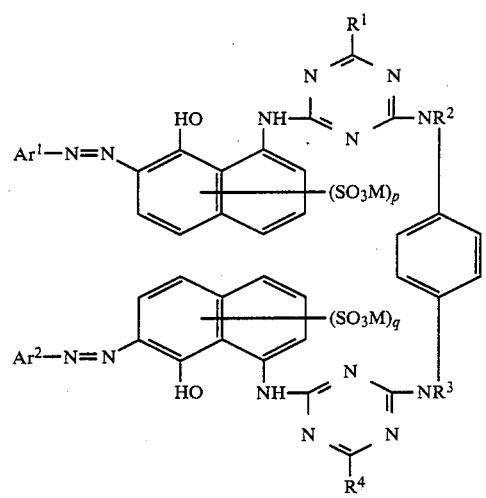

wherein
each of $Ar^1$ and $Ar^2$, independently, represents an optionally substituted phenyl or naphthyl radical,
each of $R^1$ and $R^4$, independently, represents —$OR^5$ or —$NR^6R^7$,
$R^5$ represents hydrogen or alkyl,
$R^6$ represents hydrogen, alkyl, aryl or a radical of the formula —$(C_aH_{2a}O)_m(C_bH_{2b}O)_nH$,
$R^7$ represents hydrogen, alkyl, aryl, a radical fo the formula —$(C_aH_{2a}O)_m(C_bH_{2b}O)_nH$ or a radical of a mono- or disazo dye, or
$R^6$ and $R^7$ together form a morpholine ring,
a and b are different integers from 1 to 8,
m is an integer from 1 to 10,
n is an integer from 0 to 9,
each of $R^2$ and $R^3$, independently, represents hydrogen or alkyl,
M represents hydrogen, ammonium or a monovalent metal, and each of p and q, independently is an integer from 1 to 3.

The dyes are suitable for use in ink jet printing.

19 Claims, 1 Drawing Sheet

U.S. Patent     Mar. 13, 1990     4,908,062

WATER-SOLUBLE DYE

This invention relates to a water-soluble dye and to an ink containing the dye, the ink being suitable for use in ink jet printing.

THE DYE

According to the present invention, there is provided a water-soluble dye, free from cellulose reactive groups, of the formula:

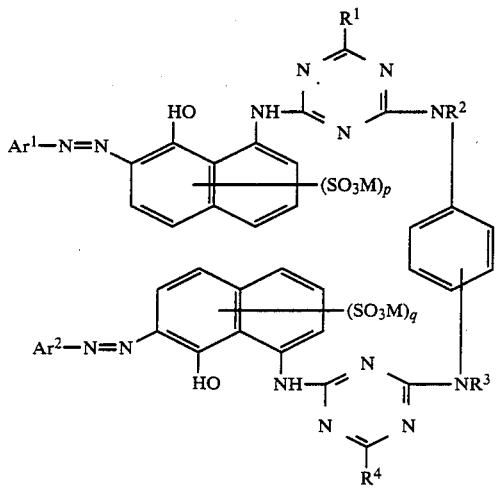

wherein
each of $Ar^1$ and $Ar^2$, independently, represents an optionally substituted phenyl or naphthyl radical,
each of $R^1$ and $R^4$, independently, represents $-OR^5$ or $-NR^6R^7$,
$R^5$ represents hydrogen or alkyl,
$R^6$ represents hydrogen, alkyl, aryl or a radical of the formula $-(C_aH_{2a}O)_m(C_bH_{2b}O)_nH$,
$R^7$ represents hydrogen, alkyl, aryl, a radical of the formula $-(C_aH_{2a}O)_m(C_bH_{2b}O)_nH$ or a radical of a mono- or disazo dye, or
$R^6$ and $R^7$ together form a morpholine ring,
a and b are different integers from 1 to 8,
m is an integer from 1 to 10,
n is an integer from 0 to 9,
each of $R^2$ and $R^3$, independently, represents hydrogen or alkyl,
M represents hydrogen, ammonium or a monovalent metal, and each of p and q, independently is an integer from 1 to 3.

The optionally substituted phenyl or naphthyl radicals represented by $Ar^1$ and $Ar^2$ are preferably phenyl or naphthyl radicals carrying at least one sulpho group ($SO_3M$) and optionally carrying other substituents. Examples of other substituents include $C_{1-4}$-alkyl, $C_{1-4}$-alkoxy, mono- or di-$C_{1-4}$-alkylamino, $C_{1-4}$-alkylcarbonylamino, unsubstituted and mono- and di-alkylaminosulphonyl and carbonyl, ureido, phenylamino, nitro, halogen, especially chlorine and hydroxy as well as optionally substituted phenylazo and naphthylazo radicals wherein the substituents may be those mentioned above.

Examples of radicals which may be represented by $Ar^1$ and $Ar^2$ include
2-sulpho-4-methoxyphenyl,
2-methyl-4-sulphonyl,
2-sulpho-4-methylphenyl,
2-sulphophenyl,
4-sulphophenyl,
1,5-disulphonaphth-2-yl,
3,6,8-trisulphonaphth-2-yl,
2,5-disulphophenyl,
2-methoxy-4-(2,5-disulphophenylazo)-5-methylphenyl,
2-methoxy-4-(2-sulpho-4-nitrophenylazo)-5-methylphenyl,
4-(thiazol-2-ylazo)-2,5-disulphophenyl,
4-(4-chloro-2,5-disulphophenylazo)-2,5-dimethylphenyl,
4-(2,5-disulphophenylazo)-2,5-dimethylphenyl.

Alkyl radicals which may be represented by $R^2$, $R^3$, $R^5$, $R^6$ and $R^7$ particularly include $C_{1-4}$ alkyl radicals, especially methyl.

Where both $R^6$ and $R^7$ are radicals of the formula $-(C_aH_{2a}O)_m(C_bH_{2b}O)_n$, they may be different but are preferably identical. It is also preferred that a and b are from 2 to 6, and more preferably 2 or 3, m is 1 or 2 and n is 0 or 1. Examples of such groups include 2-hydroxyethyl, 3-hydroxy-n-propyl, 6-hydroxy-n-hexyl and 3-(2-hydroxyethoxy)propyl. It is especially preferred that $R^6$ is hydroxyethyl and $R^7$ is H, $R^6$ and $R^7$ are both hydroxyethyl or $-NR^6R^7$ is morpholino.

The species M, associated with the sulphonic acid groups, may be any monovalent cation which forms a stable water-soluble salt of the dye and is preferably ammonium, including substituted ammonium, for example mono-, di-, tri- or quaternary-alkylammonium or substituted alkylammonium, or an alkali metal such as sodium, potassium or lithium. It is preferred that the dyes contain at least 4, more preferably at least 6, and most preferably at least 8 $-SO_3M$ groups.

An especially preferred class of dyes has the formula:

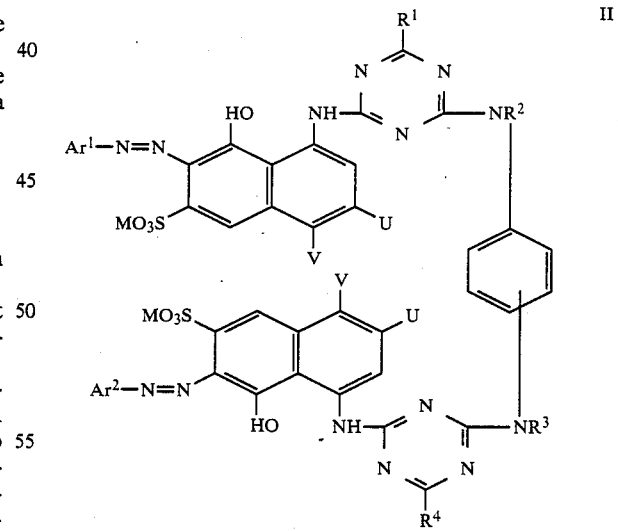

wherein $Ar^1$, $Ar^2$, $R^1$, $R^2$, $R^3$, $R^4$ and M are as hereinbefore defined, one of U and V is $-SO_3M$ and the other is H and the $NR^2$ and $NR^3$ groups are attached to the benzene ring in the 1,3- or 1,4-positions.

Specific examples of water-soluble dyes of Formula II wherein the $NR^2$ and $NR^3$ groups are attached to the benzene ring in the 1,4-positions are:
Dye 1 A dye of Formula II wherein each of $Ar^1$ and $Ar^2$ is 1,5-disulphonaphth-2-yl, each of $R^1$ and $R^4$ is hydroxyethylamino, each of $R^2$ and $R^3$ is H, U is $-SO_3M$ and V is H.

Dye 2 As Dye 1 except $R^1$ is 6-aminohexylamino and $R^4$ is hydroxy.

Dye 3 As Dye 1 except each of $R^1$ and $R^4$ is morpholino.

Dye 4 As Dye 1 except each of $Ar^1$ and $Ar^2$ is 2-sulphophenyl.

Dye 5 As Dye 4 except $R^2$ is methyl.

The water-soluble dyes of the invention may be prepared by methods that have been fully described for analogous azo dyes.

INK

The aforementioned water-soluble dyes of the present invention are adapted for use in inks, particularly writing and printing inks based upon water and/or water-miscible organic solvents, such as alkanols and glycols, and especially inks suitable for ink-jet printing wherein the ink is ejected from an orifice of a recording head in the form of liquid droplets.

For recording on paper or the like with writing tools (fountain pen, felt pen, etc.), it is conventional to use inks which are solutions of dyes in water or a water miscible organic solvent and inks of similar composition are also used in ink-jet printing.

In ink-jet printing, droplets of ink are generated in various ways and deposited on a substrate to effect a record. Suitable inks comprise, as essential components, a recording agent (usually a dye or a pigment) and a liquid vehicle (usually water, an organic solvent or mixtures thereof) and, as optional components, various other additives.

Ink-jet printing may be classified into various systems depending on the method for generation of ink droplets and the method for controlling the flight direction of ink droplets. An example of a device in accordance with one system is shown in FIG. 1.

The device shown in FIG. 1 operates by providing a printing signal at the print head section having a piezoelectric oscillator and generating ink droplets corresponding to said signal. In FIG. 1, a print head 1, comprises a piezo-oscillator 2, an inlet line 3 for ink, a liquid chamber 4, and an outlet line 5 leading to a nozzle 6 directed at a substrate 12. Ink 7 is introduced into the liquid chamber 4, through inlet 3 and fills the chamber 4 and the outlet line up to the nozzle 6. A pulsed electrical signal derived from a pattern information signal is applied to the piezo-electric oscillator 2 which transforms the pulsed electrical signal into pressure pulses and applies these to the ink 7 in the liquid chamber 4. As a result, the ink 7 is discharged as droplets 11 through the nozzle 6 thereby to effect recording on the surface of the substrate 12.

Figure 2:
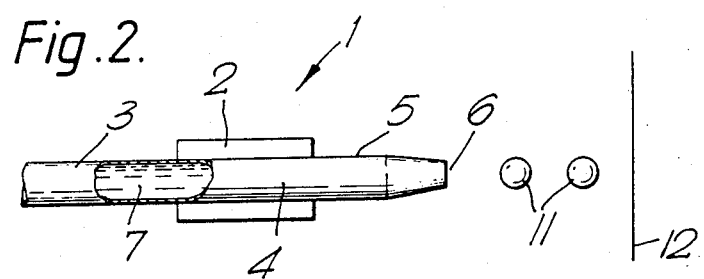

An example of another type of device using the same system is shown in FIG. 2, in which a tubular liquid chamber 4 links the inlet and outlet lines 3, 5 and a cylindrical piezoelectric oscillator 2 is arranged around the outer peripheral portion of the chamber 4. The mechanism for generation of ink droplets is essentially the same as in the device as shown in FIG. 1.

In another system, charged droplets are continuously generated but only a proportion of the droplets are selected for recording.

Figure 3:
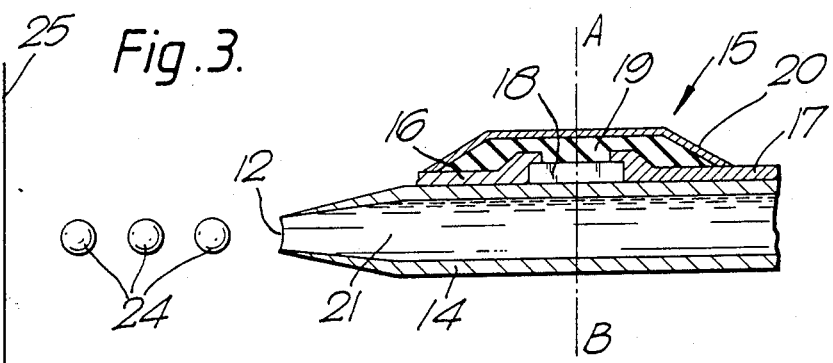
Figure 4:
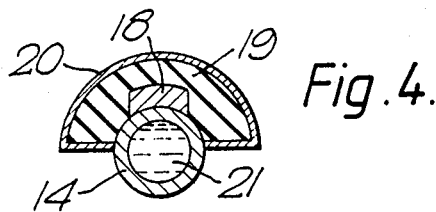

In yet another system, heat energy corresponding to the pattern information signal is imparted to the ink in the chamber of print head, and liquid droplets are formed by said energy. An embodiment of such a device is shown in FIGS. 3 and 4. FIG. 3 is a cross-sectional view along the length of a tube 14 in a print head 13 and FIG. 4 is a cross-sectional view taken on the line A-B in FIG. 3.

In FIGS. 3 and 4 a print head 13, for heat sensitive recording by the deposit of droplets 24 of ink 21 on a substrate 25, comprises a thin-walled tube 14 terminating at a nozzle 12 carrying a heat generator 15. The heat generator 15 comprises a pair of spaced aluminium electrodes 16, 17, defining a gap occupied by a nichrome heating resistor 18 the ends of the electrodes 16, 17 and the resistor 18 being encased in a layer of insulant 19 and a protective envelope 20.

In operation, an ink 21 is fed into the right hand end of the tube 14 under slight pressure and forms a meniscus at the nozzle 12.

The application of a pulsed electric signal, derived from a pattern information signal, across the electrodes 16, 17, generates pulses of heat in the resistor 18 which are transferred across the wall of the tube and cause the formation of bubbles in the ink 21 adjacent to the resistor 18. The excess pressure developed by the bubbles causes discharge of the ink 21 from the nozzle 12 in the form of small droplets 24, each corresponding to a electric pulse, directed at the substrate 25.

As ink-jet printing generates little noise and allows high speed multi-colour operation without the need for special dye fixation treatments, a number of different ink-jet printing systems are currently being intensively investigated.

Inks for any of various types of ink-jet printing systems need to meet the following criteria:

(1) Physical properties of the ink, such as viscosity and surface tension, are each within a defined range.
(2) All solutes have good solubility in the ink medium to give solutions having good stability which do not plug the fine ejecting orifices (hereinafter referred to as "solution stability").
(3) The recording agent gives images of sufficient optical density.
(4) The ink does not change in physical properties or deposit solid matter during storage.
(5) Printing can be performed without a restriction on the nature of substrate on which a record is made.
(6) The ink exhibits a high rate of fixation.
(7) The ink gives images of good resolution and having good resistance to water, solvent (particularly alcohol), light, weather and abrasion.

However, images produced by conventional inks particularly by water-based inks, tend to form blots, dislocations or scratches, or to fade by water adhesion, mechanical friction, or exposure to light and an ink free from these drawbacks is an urgent requirement.

In addition to the above criteria, inks for use in an ink jet printing process using heat energy, must also have excellent heat stability. The ink, if thermally unstable, is liable to undergo chemical change because it is exposed to a high temperature during repetition of the generation and extinction of bubbles by heating, with the result that insoluble matter forms and deposits on the wall of the heating zone of the recording head, which, in turn, renders the recording head to be eventually incapable of discharging the liquid therethrough. Accordingly, the thermal stability of the ink is very important for continuous high-speed recording over a long period of time.

Although a number of inks have been proposed to overcome these problems, none have been produced which meet all the foregoing requirements.

According to a second feature of the present invention there is provided an ink comprising a water-soluble dye of Formula I.

It is possible, by use of a dye of Formula I to obtain an ink having an improved solution stability, particularly during a prolonged storage in concentrated form, and having excellent recording properties, particularly ejection stability, ejection responsiveness, and continuous recording workability.

The present ink is of practical importance and gives images having good water resistance, alcohol resistance and light resistance.

The present ink preferably comprises the dye of Formula I and a liquid medium, such as water, an organic solvent or a mixture thereof. The dye of the first feature of the present invention has especially good solution stability in the above-mentioned liquid media, thereby improving the ejection stability of the ink and reducing the incidence of plugging of the ejecting orifice even after a long period of storage in the recording apparatus.

The amount of the dye in the ink is determined in accordance with the desired optical density of the image, the type of recording device to be used, other components to be added, the required physical properties of ink, etc. But generally speaking, a suitable dye content is in the range of 0.5–20%, preferably 0.5–15%, and especially 1–10%, by weight based on the total weight of the ink.

The present ink can contain, besides the dye of Formula I, other dyes selected from various types of known dyes such as direct dyes, acid dyes, and the like but preferably contains only a dye of Formula I or such a dye and dyes having similar performance characteristics in ink jet printing.

Liquid media used for preparing the present ink include water and mixtures of water with various water-soluble organic solvents. The water-soluble organic solvents include $C_1$–$C_4$ alkanols such as methanol, ethanol, n-propanol, isopropanol, n-butanol, sec-butanol, tert-butanol, isobutanol; amides such as dimethylformamide and dimethylacetamide; ketones or ketone alcohols such as acetone and diacetone alcohol; ethers such as tetrahydrofuran and dioxane; lactams such as N-methyl-2-pyrrolidone and 1,3-dimethyl-2-imidazol-idinone; polyalkylene glycols such as polyethylene glycol and polypropylene glycol; alkylene glycols and thioglycols containing $C_2$–$C_6$ alkylene groups such as ethylene glycol, propylene glycol, butylene glycol, triethylene glycol; thiodiglycol, hexylene glycol, and diethylene glycol; other polyols such as glycerol, 1,2,6-hexanetriol; and lower alkyl ethers of polyhydric alcohols such as 2-methoxyethanol, 2-(2-methoxyethoxy)ethanol, 2-(2-ethoxyethoxy)ethanol and 2-[2-(2-methoxyethoxy)ethoxy]ethanol, 2-[2-(2-ethoxyethoxy)-ethoxy]-ethanol.

Preferred water-soluble organic solvents among these are glycols and glycol ethers, such as ethylene glycol, diethylene glycol, triethylene glycol and 2-methoxy-2-ethoxy-2-ethoxyethanol; polyethylene glycols with molecular weights up to 500; and lactams such as N-methylpyrrolidone and 1,3-dimethyl-2-imidazolidinone. Preferred specific solvent mixtures are a binary mixture of water and diethylene glycol and a tertiary mixture of water, diethylene glycol and N-methylpyrrolidone.

The present ink preferably contains in from 5–95%, preferably 10–80%, and especially 20–50%, by weight of the water soluble organic solvent based on the total weight of the ink.

The present ink, prepared from the components mentioned above, is generally characterised by excellent and balanced recording performance characteristics i.e. signal responsiveness, stability for producing droplets, ejection stability, long-term continuous recording workability, and ejection stability after a long rest. It also generally exhibits good preservation stability, solution stability, fixation on the recording substrate and resistance of the recorded image to water, alcohol, light and weather. However, miscellaneous known additives may also be incorporated into the present ink for further improvement of these characteristics. Examples of suitable additives are viscosity modifiers, such as poly(vinyl alcohol), cellulose derivatives, and other water-soluble resins; various kinds of surfactants, i.e. cationic, anionic, and nonionic; surface tension modifiers, such as diethanolamine and triethanolamine; and pH conditioners, such as buffers.

Inks for use in ink-jet recording of the type based on the application of a charge to the ink droplets usually contain an inorganic salt, such as lithium chloride, ammonium chloride or sodium chloride as a resistivity modifier. Urea or thiourea may also be added to improve the water-retentivity of the ink at the tip of the ejecting orifice. When the present ink is used for ink-jet recording of the type based on the action of thermal energy, the thermal properties, e.g. specific heat, coefficient of thermal expansion, and heat conductivity, of the ink may be modified by suitable additives.

If the present ink is to be applied by means of a writing tool, e.g. a pen, it may be necessary to modify the viscosity and the other physical properties in relation to the affinity of the ink for the recording substrate.

The present ink represents a significant step towards satisfying all the requirements stated above, that is to say, to providing an ink which does not plug capillary tubes or ejecting orifices, does not result in deterioration or formation of precipitate during storage, is excellent in recording workability, particularly ejection ability and ejection responsiveness; and gives such good quality images as to be excellent in colour density, shade, and contrast and have good resistance to water, solvent, light weather, and abrasion and excellent fixing properties.

Furthermore, certain preferred classes of the present inks are particularly suitable for use in an ink jet recording process utilising thermal energy because of their good long term heat stability.

The invention is illustrated but not limited by the following Examples in which reference is made to dyes of the formula:

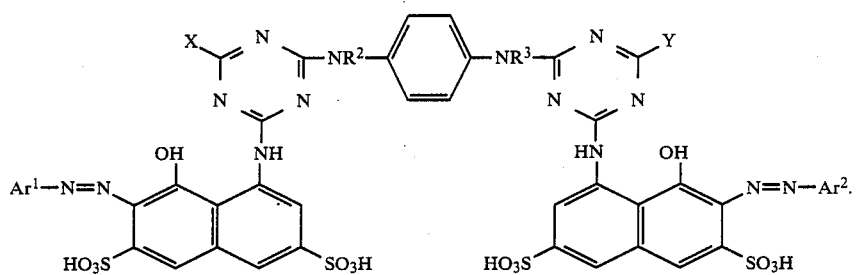

III

EXAMPLE 1

A dye of Formula III in which $X=Y=Cl$, $R^2=R^3=H$ and $Ar^1=Ar^2=1,5$-disulphonaphth-2-yl (0.01 g.mol) was added to water (345 ml) followed by ethanolamine (12.2 g; 0.2 mol). The mixture was stirred until a complete solution was obtained, the pH being about 10.5. The solution was then heated to 70° C. and stirred at that temperature for about 6 hours until reaction was essentially complete. After cooling to 40° C., the solution was neutralised to pH 7 by the addition of concentrated hydrochloric acid. Salt (100 g) was added and the mixture was cooled to room temperature, after which the precipitated product was filtered off and washed with 100 ml of a 20% salt solution. The product was dried to give 17 g of a magenta solid of Formula III in which $X=Y=-NHC_2H_4OH$, $R^2$, RHu 3, $Ar^1$ and $Ar^2$ being as already stated.

EXAMPLE 2

The dye of Formula III used as starting material in Example 1 (0.01 g.mol) was added to water (345 ml) and the pH was raised to approximately 12 by the addition of caustic soda liquor, 1,6-hexane diamine (1.3 g; 0.011 g.mol) then being added. The reaction mixture was heated to 70° C. and maintained at that temperature for about 6 hours until reaction was essentially complete. The solution was cooled to room temperature, acidified to pH 2 by the addition of concentrated hydrochloric acid and salt was added to give a concentrated solution. The product slowly precipitated and was filtered off and dried to give 14.4 g of a magenta solid.

The structure was as in the starting material except that $X=-NH(CH_2)_6NH_2$ and $Y=OH$.

EXAMPLE 3

The dye of Formula III used as starting material in Example 1 (0.01 g.mol) was added to water (345 ml) followed by morpholine (17.4 g; 0.2 mol). The mixture was stirred and heated to 70° C. and held at that temperature for 12 hours, the reaction then being essentially complete. The solution was cooled to room temperature and neutralised to pH 7 by the addition of concentrated hydrochloric acid. Salt (125 g) was added and the product was precipitated by the addition of ethanol (350 ml). Filtration and drying gave 13.5 g of a magenta solid having the same structure as the starting material except that $X=Y=$ morpholino.

EXAMPLE 4

A dye of Formula III in which $X=Y=Cl$, $R^2=R^3=H$ and $Ar^1=Ar^2=2$-sulphophenyl (0.01 g.mol) was added to water (250 ml) followed by ethanolamine (12.2 g; 0.2 mol). After proceeding as described in Example 1, 13 g of a red solid were obtained having the same structure as the starting material except that $X=Y=-NHC_2H_4OH$.

EXAMPLE 5

A dye of Formula III having the same structure as the starting material of Example 4 except that $R^2=$ methyl was reacted as described in Example 4 to give a red solid having $X=Y=-NHC_2H_4OH$, $R^2=CH_3$, $R^3=H$ and $Ar^1=Ar^2=2$-sulphophenyl.

EXAMPLE 6

The products from Examples 1 to 5 were purified to ink-jet standard requirements using known procedures such as dialysis to remove inorganic compounds, optional treatment to remove metals such as calcium and filtration to remove finely divided solids followed by evaporation to dryness to give a purified solid.

An ink was prepared by dissolving the purified solid in a known ink medium (water 6 parts, diethylene glycol 3 parts, N-methylpyrrolidone 1 part) which, after application to plain paper by known techniques, gave magenta prints which were fast to light and washing.

We claim:

1. A water-soluble dye, free from cellulose reactive groups, of the formula:

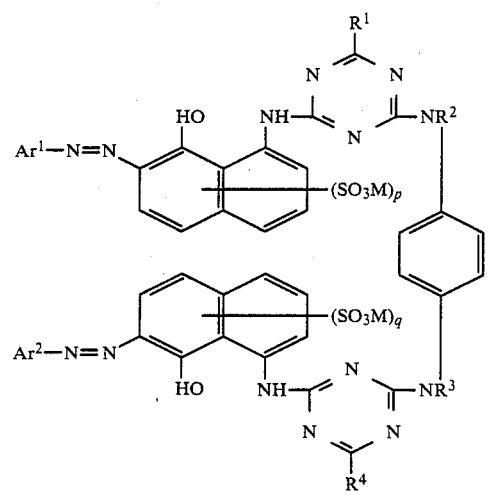

wherein each of $Ar^1$ and $Ar^2$, independently, represents an optionally substituted phenyl or naphthyl radical, each of $R^1$ and $R^4$, independently, represents $-OR^5$ or $-NR^6R^7$, $R^5$ represents hydrogen or alkyl, $R^6$ represents hydrogen, alkyl, aryl or a radical of the formula $-(C_aH_{2a}O)_m(C_bH_{2b}O)_nH$, $R^7$ represents hydrogen, alkyl, aryl, a radical of the formula $-(C_aH_{2a}O)_m(C_bH_{2b}O)_nH$ or a radical of a mono- or disazo dye, or $R^6$ and $R^7$ together form a morpholine ring, a and b are different integers from 1 to 8, m is an integer from 1 to 10, n is an integer from 0 to 9, each of $R^2$ and $R^3$, independently, represents hydrogen or alkyl, M represents hydrogen, ammonium or a monovalent metal, and each of p and q, independently is an integer from 1 to 3.

2. A water-soluble dye according to claim 1 wherein each of $Ar^1$ and $Ar^2$ is a phenyl or naphthyl radical carrying at least one sulpho group.

3. A water-soluble dye according to claim 1 wherein at least one of $R^1$ and $R^4$ is hydroxyethylamino or bis(hydroxyethyl)amino.

4. A water-soluble dye according to claim 1 wherein at least one of $R^1$ and $R^4$ is morpholino.

5. A water-soluble dye according to claim 1 containing at least 6 $-SO_3M$ groups.

6. A water-soluble dye according to claim 5 containing at least 8 $-SO_3M$ groups.

7. A water-soluble dye according to claim 1 having the formula:

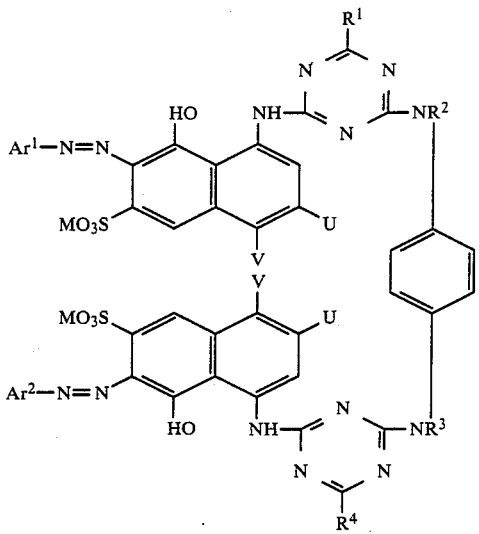

wherein $Ar^1$, $Ar^2$, $R^1$, $R^2$, $R^3$, $R^4$ and M are as defined in claim 1, one of U and V is $-SO_3M$ and the other is H and the $NR^2$ and $NR^3$ groups are attached to the benzene ring in the 1,3- or 1,4-positions.

8. A water-soluble dye according to claim 7 wherein each of $Ar^1$ and $Ar^2$ is 1,5-disulphonaphthyl-2-yl, each of $R^1$ and $R^4$ is hydroxyethylamino, each of $R^2$ and $R^3$ is H, U is $-SO_3M$ and V is H.

9. A water-soluble dye according to claim 7 wherein each of $Ar^1$ and $Ar^2$ is 1,5-disulphonaphth-2-yl, $R^1$ is 6-aminohexylamino, $R^4$ is hydroxy, each of $R^2$ and $R^3$ is H, U is $-SO_3M$ and V is H.

10. A water-soluble dye according to claim 7 wherein each of $Ar^1$ and $Ar^2$ is 1,5-disulphonaphth-2-yl, each of $R^1$ and $R^4$ is morpholino, each of $R^2$ and $R^3$ is H, U is $-SO_3H$ and V is H.

11. A water-soluble dye according to claim 7 wherein each of $Ar^1$ and $Ar^2$ is 2-sulphophenyl, each of $R^1$ and $R^4$ is hydroxyethylamino, each of $R^2$ and $R^3$ is H, U is $-SO_3M$ and V is H.

12. A water-soluble dye according to claim 7 wherein each of $Ar^1$ and $Ar^2$ is 2-sulphophenyl, each of $R^1$ and $R^4$ is hydroxyethylamino, $R^2$ is methyl, $R^3$ is H, U is $-SO_3M$ and V is H.

13. An ink comprising a water-soluble dye as defined in claim 1.

14. An ink according to claim 13 comprising a solution of the dye in water, an organic solvent or a mixture of water and an organic solvent.

15. An ink according to claim 13 containing from 0.5 to 20% by weight of dye based on the total weight of ink.

16. An ink according to claim 13 wherein the organic solvent comprises a glycol or a lactam.

17. An ink according to claim 16 wherein the glycol is diethylene glycol.

18. An ink according to claim 16 wherein the lactam is N-methylpyrrolidone.

19. A method of printing which comprises ejecting an ink according to claim 13 from a small orifice in the form of droplets directed towards a substrate on which an image is to be formed.

* * * * *